US011724898B2

(12) United States Patent
Yamamoto (10) Patent No.: US 11,724,898 B2
(45) Date of Patent: Aug. 15, 2023

(54) IMAGE PROCESSING DEVICE (71) Applicant: TOSHIBA TEC KABUSHIKI KAISHA, Tokyo (JP)

(72) Inventor: Mikio Yamamoto, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/407,388

(22) Filed: Aug. 20, 2021

(65) Prior Publication Data
US 2023/0056859 A1 Feb. 23, 2023

(51) Int. Cl.
*B65H 1/26* (2006.01)
*B65H 1/14* (2006.01)
*H04N 1/00* (2006.01)

(52) U.S. Cl.
CPC ............. *B65H 1/266* (2013.01); *B65H 1/14* (2013.01); *H04N 1/00668* (2013.01); *B65H 2405/121* (2013.01)

(58) Field of Classification Search
CPC . B65H 1/04; B65H 1/26; B65H 1/266; B65H 2405/12; B65H 2405/121
See application file for complete search history.

(56) References Cited

U.S. PATENT DOCUMENTS

| 9,745,154 B1* | 8/2017 | Lawrence | B65H 1/266 |
| 2006/0153609 A1* | 7/2006 | Gotoh | G03G 15/6502 |
| | | | 399/393 |
| 2006/0237898 A1 | 10/2006 | Mizobe | |
| 2016/0332829 A1* | 11/2016 | Eguchi | B65H 1/266 |
| 2018/0127222 A1* | 5/2018 | Kuno | B65H 1/266 |

FOREIGN PATENT DOCUMENTS

| JP | 11-91962 | 4/1999 |
| JP | 2007-161448 | 6/2007 |
| JP | 2009-23754 | 2/2009 |

* cited by examiner

*Primary Examiner* — Prasad V Gokhale
(74) *Attorney, Agent, or Firm* — Amin, Turocy & Watson, LLP (57) ABSTRACT

According to one embodiment, an image processing device includes a cassette main body, a device main body, a handle, and a pressing member. The cassette main body contains a sheet. The device main body stores the cassette main body retractably in a first direction. The handle is displaceably supported by the cassette main body. The pressing member is supported by the cassette main body. The pressing member presses the device main body in a second direction opposite to the first direction in conjunction with displacement of the handle with respect to the cassette main body.

17 Claims, 6 Drawing Sheets

IMAGE PROCESSING DEVICE

FIELD

Embodiments described herein relate generally to an image processing device and a cassette system.

BACKGROUND

An image processing device forms an image on a sheet or erases an image formed on a sheet. The image processing device includes a paper feed cassette that stores a sheet. The paper feed cassette is retractably stored in a device main body. If the paper feed cassette is manually retracted, an inertial force or a force of a pull-in mechanism that pulls the paper feed cassette into the device main body acts on the paper feed cassette. In this case, if the paper feed cassette is retracted, the load on a user likely increases to the user's disadvantage.

DETAILED DESCRIPTION

In general, according to one embodiment, an image processing device includes a cassette main body, a device main body, a handle, and a pressing member. The cassette main body contains a sheet. The device main body stores the cassette main body retractably in a first direction. The handle is displaceably supported by the cassette main body. The pressing member is supported by the cassette main body. The pressing member presses the device main body in a second direction opposite to the first direction in conjunction with displacement of the handle with respect to the cassette main body.

Hereinafter, the image processing device according to the embodiment is described with reference to the drawings. In the following description, a depth direction is set as an X axis direction. A width direction is set as a Y axis direction. A vertical direction is set as a Z axis direction. The depth direction, the width direction, and the vertical direction are orthogonal to each other. In the figures, an arrow X direction is a front side (first direction), and a direction opposite to the arrow X direction is an inner side (second direction). In the figures, an arrow Y direction is a right side in the width direction, and a direction opposite to the arrow Y direction is a left side in the width direction. In the figures, an arrow Z direction is an upper side, and a direction opposite to the arrow Z direction is a lower side.

Figure 1:
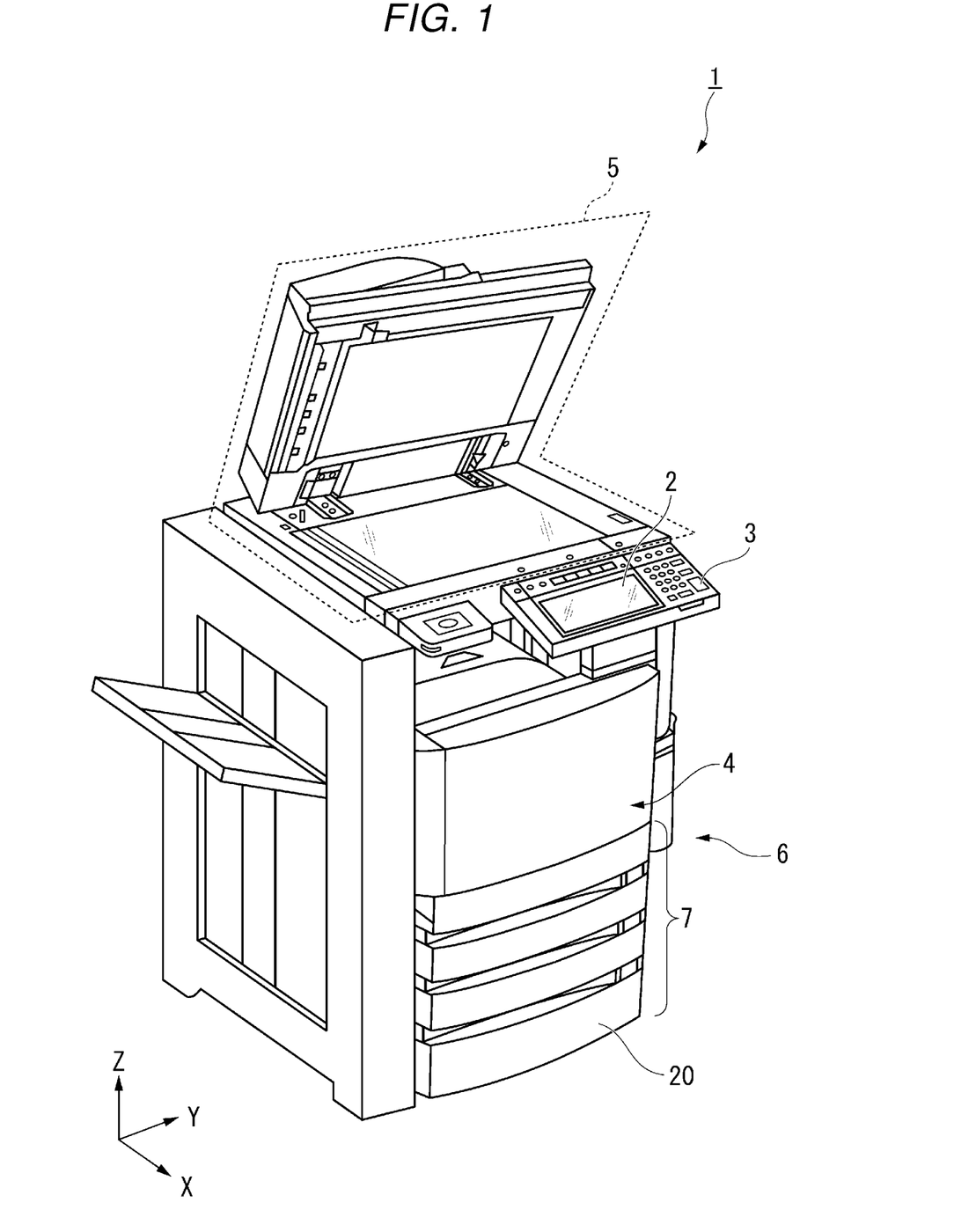
FIG. 1 is a perspective view illustrating an image processing device according to an embodiment.

FIG. 1 is a perspective view of an image processing device 1 according to the embodiment. The image processing device 1 according to the present embodiment is, for example, an image forming device such as a Multi Function Peripheral (MFP) printer or a copying machine. Hereinafter, an example in a case where the image processing device 1 is an image forming device illustrated in FIG. 1 is described.

As illustrated in FIG. 1, the image processing device 1 includes a display 2, a control panel unit 3, an image forming unit 4, an image reading unit 5, a device main body 6, and a sheet container 7. The display 2 and the control panel unit 3 are used in a case where the user operates the image processing device 1. The image forming unit 4 forms an image on a sheet. For example, the sheet is paper. The image reading unit 5 converts characters and images printed on the sheet into electronic data.

The device main body 6 is a housing including the display 2, the control panel unit 3, the image forming unit 4, the image reading unit 5, and the sheet container 7. The device main body 6 includes the sheet container 7 in the space in the lower portion. The sheet container 7 includes a paper feed cassette 20.

The paper feed cassette 20 can retract from the device main body 6 to the front side. The paper feed cassette 20 is displaced between an insertion position and a retraction position in both directions along the depth direction. The insertion position is a position of the paper feed cassette 20 completely inserted into the device main body 6 to the inner side. The retraction position is a position of the paper feed cassette 20 retracted from the device main body 6 to the front side. Hereinafter, the paper feed cassette 20 is described on the assumption of being in the insertion position unless otherwise specified.

Figure 2:
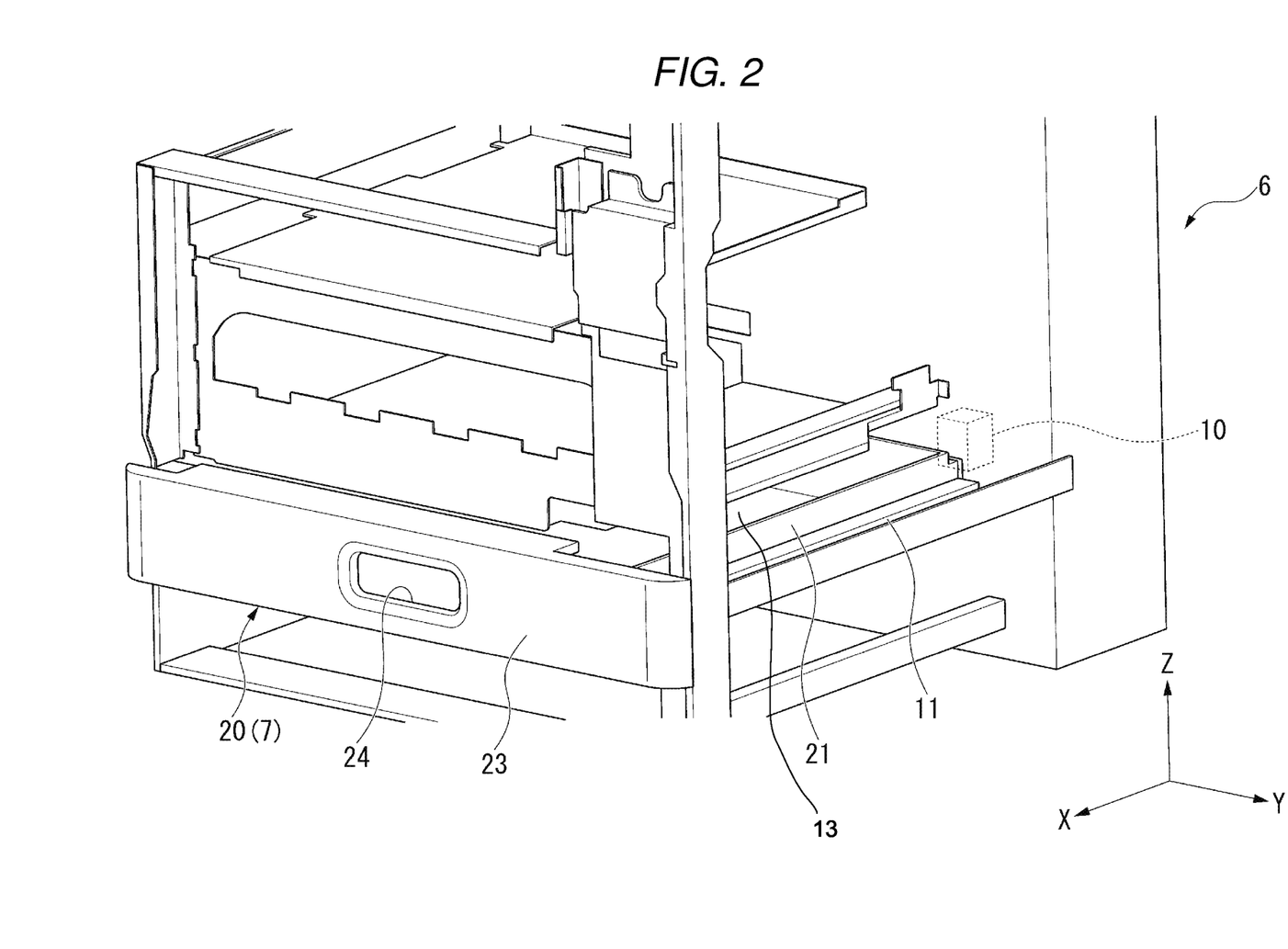
FIG. 2 is a perspective view illustrating an internal structure of a lower portion of the image processing device.

FIG. 2 is a perspective view illustrating an internal structure of the lower portion of the image processing device 1 according to the embodiment. FIG. 2 illustrates only one of the plurality of paper feed cassettes 20 that configure the sheet container 7, and the others are omitted.

As illustrated in FIG. 2, the device main body 6 includes a pull-in mechanism 10 and a pair of left and right slide portions 11.

The pull-in mechanism 10 pulls the paper feed cassette 20 into the device main body 6. If the paper feed cassette 20 is retracted to the front side, the pull-in mechanism 10 presses the paper feed cassette 20 to the inner side. The force to the inner side applied by the pull-in mechanism 10 to the paper feed cassette 20 is referred to as a retraction force. The pull-in mechanism 10 is coupled to an end portion on the inner and right side of the paper feed cassette 20 and applies the retraction force to the paper feed cassette 20.

Figure 3:
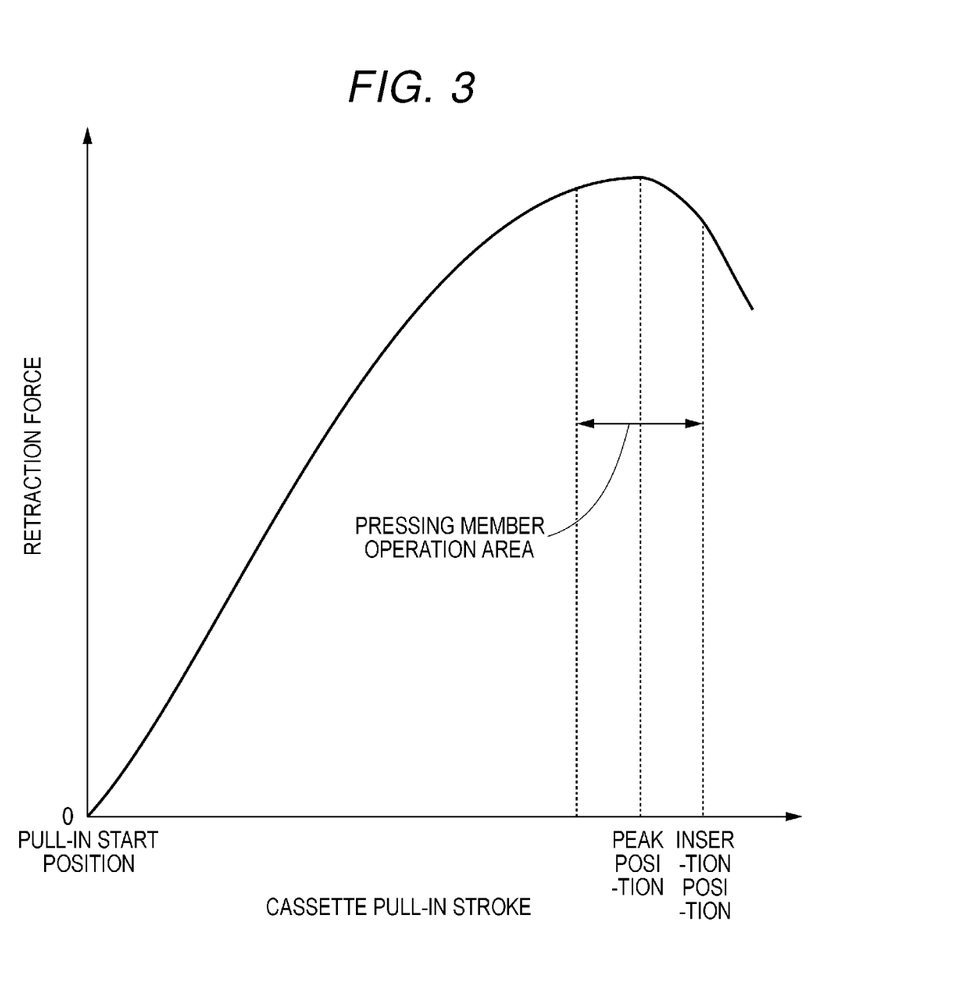
FIG. 3 is a graph illustrating a relationship between a position of a paper feed cassette and a retraction force applied to the paper feed cassette in a depth direction.

FIG. 3 is a graph illustrating a relationship between the position of the paper feed cassette 20 in the depth direction and the retraction force applied to the paper feed cassette 20. The horizontal axis of the graph illustrated in FIG. 3 represents a distance from a pull-in start position with the inner side as positive. A vertical axis of the graph illustrated in FIG. 3 represents the retraction force applied by the pull-in mechanism 10 to the paper feed cassette 20.

As illustrated in FIG. 3, the pull-in mechanism 10 applies the retraction force larger than 0 to the paper feed cassette 20 in an area from the insertion position to the pull-in start position on the front side of the insertion position. The pull-in mechanism 10 applies the maximum retraction force to the paper feed cassette 20 that is the peak position between the insertion position and the pull-in start position.

As illustrated in FIG. 2, the pair of right and left slide portions 11 support the paper feed cassette 20. The slide portions 11 are supported so that the paper feed cassette 20 can move in parallel and reciprocate in the depth direction with respect to the device main body 6.

The paper feed cassette 20 is between the pair of right and left slide portions 11. The paper feed cassette 20 includes a cassette main body 21 and a front cover 23.

The cassette main body 21 comprises a sheet holding portion 13 and contains a sheet. The cassette main body 21 is formed in a box shape that opens upward. The cassette main body 21 is stored in the device main body 6. The left and right side portions of the cassette main body 21 are supported by the device main body 6 via the slide portions 11, respectively.

The cassette main body 21 is covered with the front cover 23 from the front side. The front cover 23 has a rectangular shape having a length in the width direction. An opening 24 penetrates the central portion of the front cover 23. The opening 24 has a size that enables the user to insert a hand.

Figure 4:
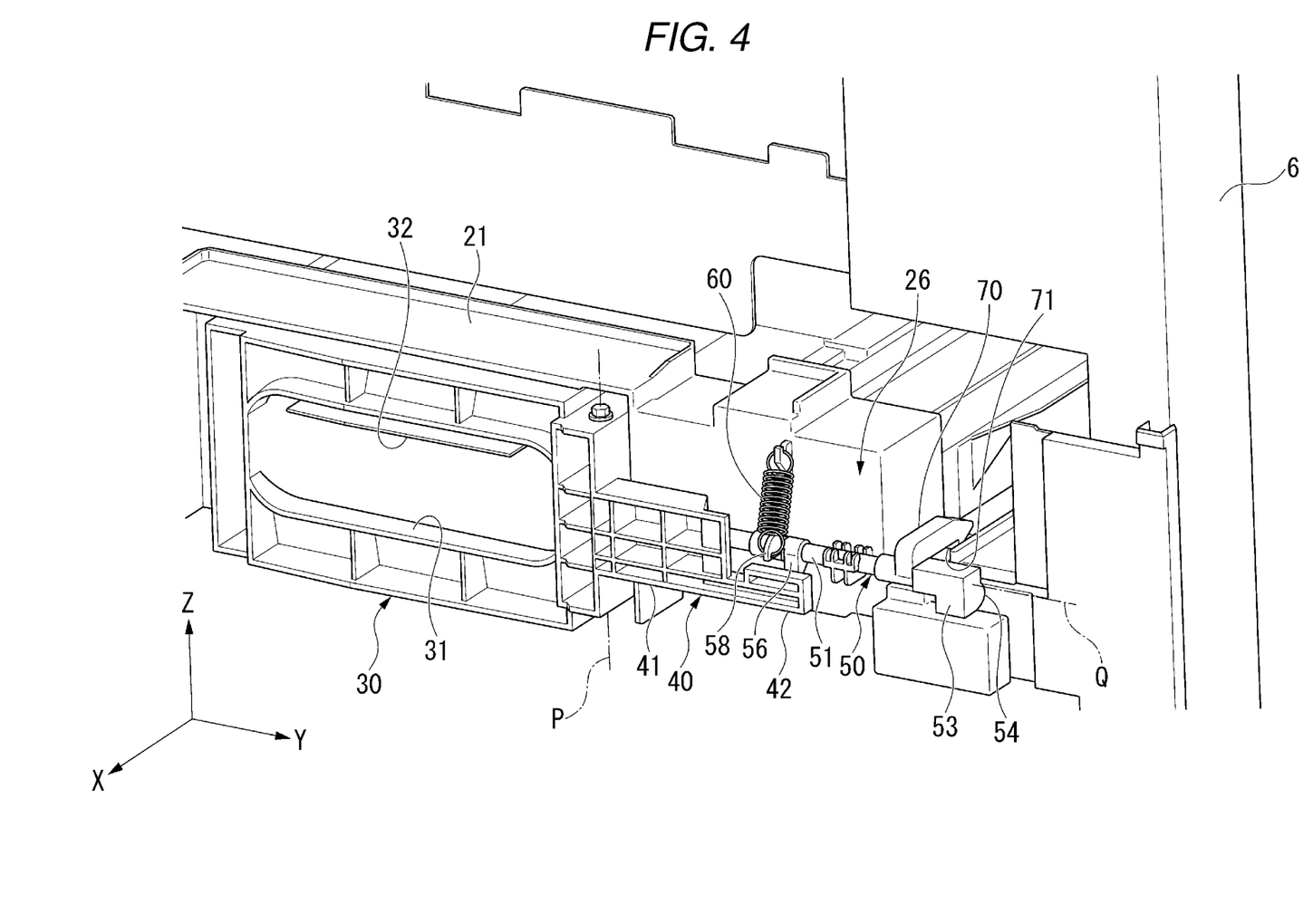
FIG. 4 is a perspective view illustrating a state in which a front cover is removed from the image processing device illustrated in FIG. 2.

FIG. 4 is a perspective view illustrating a state in which the front cover 23 is removed from the image processing device 1 illustrated in FIG. 2.

As illustrated in FIG. 4, the paper feed cassette 20 includes an extrusion mechanism 26. The extrusion mechanism 26 becomes the inner side of the front cover 23 and is covered with the front cover 23 from the front side. The extrusion mechanism 26 presses the device main body 6 to the inner side with respect to the cassette main body 21 and the front cover 23 which are at the insertion positions. The extrusion mechanism 26 includes a handle 30, a torque applying portion 40, a pressing member 50, an urging member 60, and a locking member 70.

The handle 30 is displaceably supported by the cassette main body 21. The handle 30 is an inner side of the pair of right and left slide portions 11 and the pull-in mechanism 10 in the width direction. The handle 30 is between the cassette main body 21 and the front cover 23. The handle 30 has a rectangular shape. A recess portion 31 opens in the central portion of the handle 30 to the front side. The recess portion 31 of the present embodiment penetrates the handle 30 in the depth direction. A grip portion 32 is formed on the upper portion of the inner surface of the recess portion 31. The grip portion 32 projects to the inner side of the recess portion 31 and extends in the width direction. The grip portion 32 can be gripped from below by the user's hand inserted to the inner side of the front cover 23 via the opening 24 of the front cover 23.

The handle 30 is supported by the cassette main body 21 rotatably about a first axis P. The first axis P extends in the vertical direction. The first axis P passes through a portion on the right side of the recess portion 31 in the handle 30. The handle 30 is, for example, in contact with the cassette main body 21 from the front side to be restricted from the displacement to the inner side about the first axis P. The handle 30 is displaced to the front side in the depth direction about the first axis P. Hereinafter, a state in which the handle 30 is positioned on the innermost side is described, unless otherwise specified.

The torque applying portion 40 is connected to the handle 30. The torque applying portion 40 is integrally provided in the handle 30. The torque applying portion 40 extends from the right end portion of the handle 30 to the right side. The torque applying portion 40 is on the front side of the cassette main body 21. The torque applying portion 40 is disposed on the cassette main body 21 with a distance in the depth direction.

The torque applying portion 40 is a lever that rotates about the first axis P. The torque applying portion 40 includes a base end portion 41 that extends from the handle 30 to the right side, and a tip end portion 42 that extends from the base end portion 41 to the right side. The base end portion 41 has a constant width in the vertical direction. The tip end portion 42 is smaller than the base end portion 41 in the vertical direction. The tip end portion 42 is connected to the lower portion at the right end of the base end portion 41. The tip end portion 42 is displaced to the inner side in the depth direction about the first axis P according to the displacement of the handle 30 to the front side about the first axis P. The torque applying portion 40 is in contact with the pressing member 50, and applies torque to the pressing member 50 in response to the displacement of the handle 30.

The distance from the first axis P to the center of the recess portion 31 of the handle 30 in the width direction is defined as a first lever length. The distance from the first axis P to the contact point of the torque applying portion 40 and the pressing member 50 is defined as a second lever length. The first lever length is larger than the second lever length. The second lever length may change in response to the displacement of the handle 30 and the torque applying portion 40. The first lever length is desirably larger than the second lever length regardless of displacement amounts of the handle 30 and the torque applying portion 40.

The pressing member 50 is provided separately from the handle 30 and the torque applying portion 40. The pressing member 50 is supported by the cassette main body 21. The pressing member 50 presses the device main body 6 to the inner side in conjunction with the displacement of the handle 30 with respect to the cassette main body 21. The pressing member 50 presses the device main body 6 to the inner side on the same side as the pull-in mechanism 10 with respect to intermediate position between the pair of right and left slide portions 11 in the width direction. The pressing member 50 presses the device main body 6 on the side opposite to the handle 30 with respect to the pull-in mechanism 10 in the width direction when viewed from the front side. The pressing member 50 includes a shaft 51, a cam portion 53, an arm 56, and a hook 58.

Figure 5:
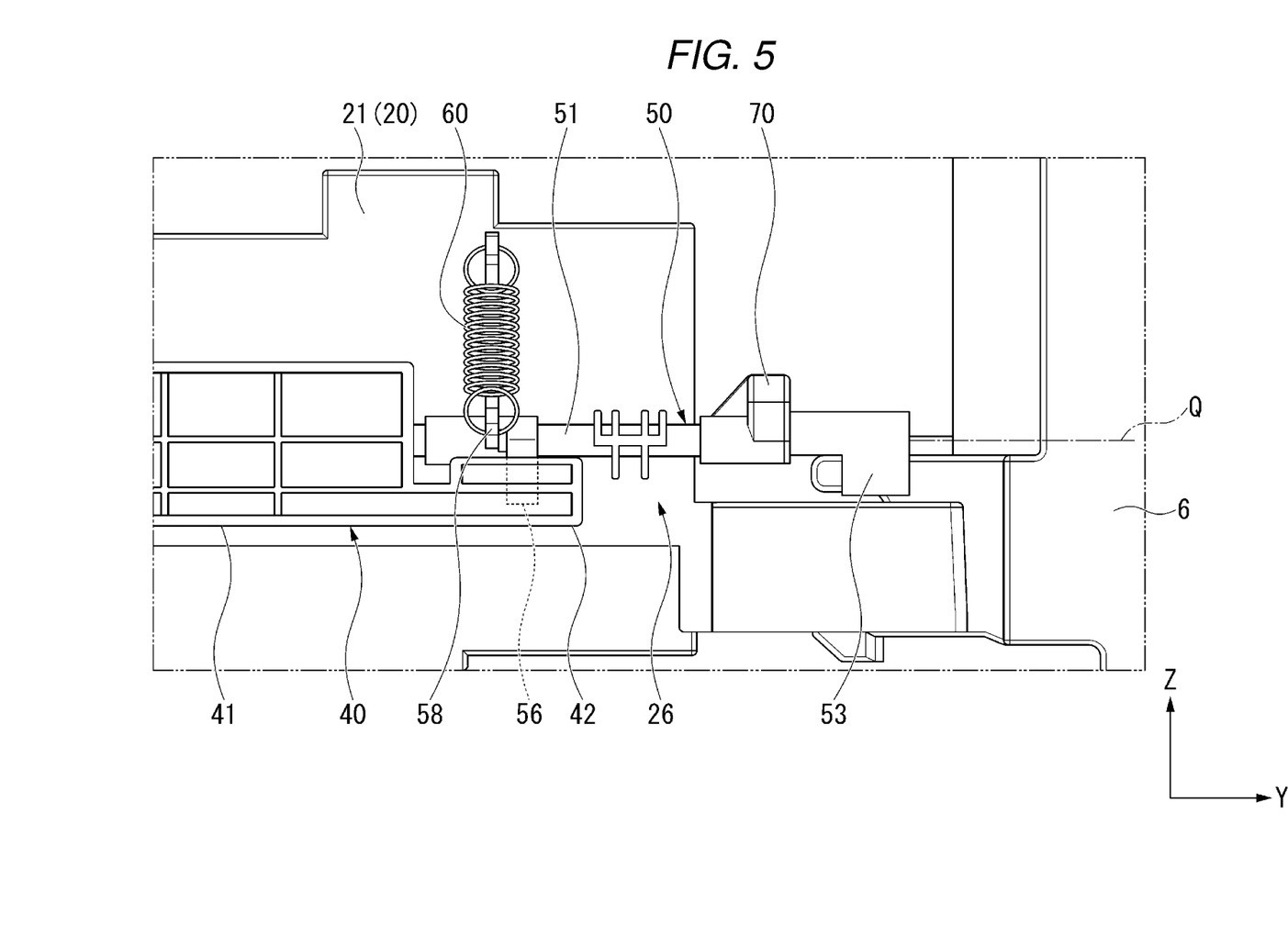
FIG. 5 is a front view illustrating the image processing device illustrated in FIG. 4.

FIG. 5 is a front view illustrating the image processing device 1 illustrated in FIG. 4.

As illustrated in FIG. 5, the shaft 51 is supported by the cassette main body 21 rotatably about a second axis Q. The second axis Q extends in the width direction. The shaft 51 has a columnar shape having the second axis Q as the central axis. The shaft 51 is over the tip end portion 42 of the torque applying portion 40 when viewed from the front side. The shaft 51 is on the cassette main body 21 side of the torque applying portion 40. The right end portion of the shaft 51 is on the outer side of the cassette main body 21 in the width direction when viewed from the front side.

The cam portion 53 is supported by the shaft 51. The cam portion 53 is fixed to the right end portion of the shaft 51. The cam portion 53 is integrated with the shaft 51 and rotates about the second axis Q with respect to the cassette main body 21.

Figure 6:
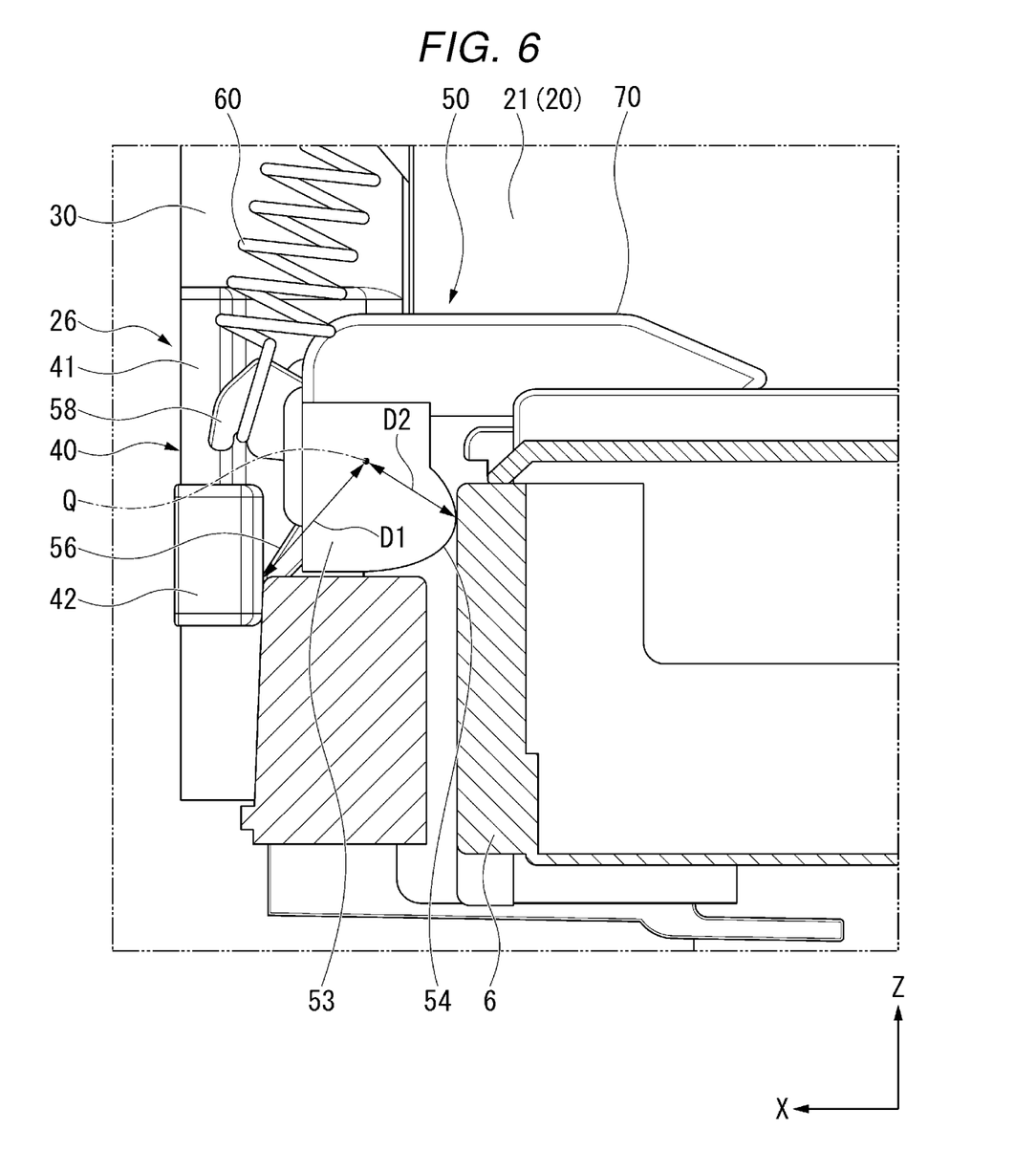
FIG. 6 is a right side view illustrating the image processing device illustrated in FIG. 4.

FIG. 6 is a right side view illustrating the image processing device 1 illustrated in FIG. 4.

As illustrated in FIG. 6, the cam portion 53 includes a cam surface 54 that is in contact with the inner side from the front side with respect to the device main body 6. The cam surface 54 is in contact with the member fixedly disposed on a frame of the device main body 6 or the like. The cam surface 54 is in sliding contact with the peripheral edge of the insertion port of the paper feed cassette 20 in the device main body 6 (see also FIG. 4). The cam surface 54 extends so as to move away from the second axis Q in the clockwise direction about the second axis Q when viewed from the right side. The cam portion 53 presses the device main body 6 to the inner side according to the rotation in the counterclockwise direction when viewed from the right side.

As illustrated in FIGS. 5 and 6, the arm 56 is fixed to the shaft 51. The arm 56 projects outward in the radial direction of the shaft 51. The arm 56 projects downward from the shaft 51. The arm 56 is in contact with the tip end portion 42 of the torque applying portion 40 from the inner side. The arm 56 is displaced to the inner side according to the displacement of the tip end portion 42 of the torque applying portion 40 to the inner side and rotates in the counterclockwise direction when the shaft 51 is viewed from the right side.

The distance from the contact point of the torque applying portion 40 and the arm 56 to the second axis Q is defined as a first distance D1. The distance from the contact point of the cam portion 53 and the device main body 6 to the second axis Q is defined as a second distance D2. The first distance D1 is larger than the second distance D2. The first distance D1 and the second distance D2 may change in response to the rotation angle of the shaft 51. The first distance D1 may be larger than the second distance D2 in at least a portion of a state from the start to the completion of pushing the device main body 6 by the cam portion 53. According to the present embodiment, the first distance D1 is larger than the second distance D2 in the entire state from the start to the completion of pushing the device main body 6 by the cam portion 53.

The hook 58 is fixed to the shaft 51. The hook 58 projects outward in the radial direction of the shaft 51. The hook 58 projects from the shaft 51 to the front side. The hook 58 is on the left side of the arm 56. The hook 58 is integrally provided on the arm 56. The hook 58 has a hook shape that can lock the urging member 60. The hook 58 may be provided separately from the arm 56.

The urging member 60 urges the pressing member 50 toward the position before the displacement. The urging member 60 is locked by the hook 58. The urging member 60 upwardly urges the hook 58 to the cassette main body 21. The urging member 60 generates an urging force in the clockwise direction to the pressing member 50 when viewed from the right side. For example, the urging member 60 is a tension coil spring. The urging member 60 is bridged between the cassette main body 21 and the hook 58 in a state of being extended from the natural state. Since the arm 56 is in contact with the tip end portion 42 of the torque applying portion 40 from the inner side, the urging member 60 urges the handle 30 toward the position before the displacement. Since the handle 30 is stationary at the position before the displacement, the pressing member 50 is stationary while receiving the urging force of the urging member 60.

As illustrated in FIG. 4, the locking member 70 is fixed to the shaft 51. The locking member 70 projects outward in the radial direction of the shaft 51. The locking member 70 projects from the shaft 51 to the inner side on the right side of the cassette main body 21. A tip end 71 of the locking member 70 projects in the clockwise direction about the second axis Q when viewed from the right side. The tip end 71 of the locking member 70 is locked by the device main body 6. The locking member 70 cannot be displaced to the front side with respect to the device main body 6. The locking member 70 is locked by the device main body 6 to restrict the displacement of the cassette main body 21 to the front side. The tip end 71 of the locking member 70 separates from the device main body 6 by the rotation in the counterclockwise direction when the locking member 70 is viewed from the right side to release the locking by the device main body 6.

An operation of retracting the paper feed cassette 20 from the device main body 6 is described.

When retracting the paper feed cassette 20, the locking member 70 locked by the device main body 6 is separated from the device main body 6. Specifically, the user inserts a hand to the opening 24 of the front cover 23 of the paper feed cassette 20 and pulls the handle 30 to the front side. By the displacement of the handle 30 to the front side, the torque applying portion 40 is displaced to the inner side, and the arm 56 of the pressing member 50 is displaced to the inner side.

The pressing member 50 rotates in the counterclockwise direction when the second axis Q is viewed from the right side according to the displacement of the arm 56 to the inner side while resisting to the urging force of the urging member 60 together with the locking member 70. The locking member 70 separates from the device main body 6 by rotation in the counterclockwise direction about the second axis Q. By the separation of the locking member 70 from the device main body 6, the paper feed cassette 20 can be retracted from the device main body 6 to the front side.

The cam portion 53 rotates in the counterclockwise direction when viewed from the right side to cause the cam surface 54 in sliding contact with the device main body 6. The cam portion 53 presses the device main body 6 to the inner side by the sliding contact of the cam surface 54. The cam portion 53 presses the device main body 6 after the locking of the locking member 70 by the device main body 6 is released. For example, the cam surface 54 may be in sliding contact with the device main body 6 after the locking of the locking member 70 by the device main body 6 is released. However, the cam surface 54 may cause the outer diameter to be in sliding contact with the device main body 6 in a constant portion until the locking of the locking member 70 by the device main body 6 is released. The cassette main body 21 is displaced to the front side with respect to the device main body 6 together with the front cover 23 by the cam portion 53 pressing the device main body 6 to the inner side. The pressing member 50 presses the device main body 6 in a state in which the paper feed cassette 20 illustrated in FIG. 3 is in the pressing member operation area. The pressing member operation area includes a peak position. The pressing member 50 passes through the peak position from the insertion position to the paper feed cassette 20 and is displaced toward the pull-in start position.

After the operation of pressing the device main body 6 by the pressing member 50 is completed, the displacement of the handle 30 to the front side is restricted by the contact of the handle 30 with the front cover 23 or the like. If the displacement of the handle 30 to the front side is restricted, the user can retract the paper feed cassette 20 to the front side without receiving assistance of the extrusion mechanism 26.

As described above, the image processing device 1 of the present embodiment includes the pressing member 50 supported by the cassette main body 21. The pressing member 50 presses the device main body 6 to the inner side in conjunction with the displacement of the handle 30 with respect to the cassette main body 21. According to the configuration, by the displacement of the handle 30 with respect to the cassette main body 21 if the cassette main body 21 is retracted, the pressing member 50 presses the device main body 6 to the inner side. If the pressing member 50 presses the device main body 6 to the inner side, the cassette main body 21 is displaced to the front side with respect to the device main body 6. Accordingly, by the displacement of the handle 30 with respect to the cassette main body 21, the cassette main body 21 can be displaced to the front side with respect to the device main body 6 according to the assistance of the pressing member 50. Therefore, as the cassette main body 21 is displaced to the front side according to the displacement of the handle 30 with respect to the cassette main body 21, the cassette main body 21 can be retracted with a small force. Therefore, the load of the user when retracting the paper feed cassette 20 can be reduced.

The handle 30 can be displaced to the front side in the depth direction with respect to the cassette main body 21. According to this configuration, by the displacement of the handle 30 to the front side according to the operation of retracting the cassette main body 21 to the front side, the pressing member 50 can be operated. Accordingly, the paper feed cassette 20 can be smoothly retracted.

The image processing device 1 has the locking member 70 supported by the cassette main body 21. The locking member 70 releases the locking by the device main body 6 in conjunction with the displacement of the handle 30 together with being locked by the device main body 6. The pressing member 50 is integrally displaced by the locking member 70. According to this configuration, releasing the locking of the locking member 70 by the device main body 6 and an assistance operation of the pressing member 50 can be performed in a series of operations. Accordingly, the paper feed cassette 20 can be smoothly retracted.

The pressing member 50 presses the device main body 6 after the locking of the locking member 70 by the device main body 6 is released. According to this configuration, a force of the front side according to the displacement of the cassette main body 21 to the front side is not applied from the locking member 70 to the engaging portion of the locking member 70 and the device main body 6. Therefore, the operation of releasing the locking of the locking member 70 by the device main body 6 can be prevented from being hindered. Accordingly, the paper feed cassette 20 can be smoothly retracted.

The pressing member 50 is provided separately from the handle 30. According to this configuration, by adding the pressing member 50 to a device in the related art that includes a lock mechanism including the handle 30 and the locking member 70, the image processing device 1 according to the present embodiment can be formed.

The image processing device 1 includes the urging member 60. The urging member 60 urges the pressing member 50 toward the position before the displacement. According to this configuration, the pressing member 50 returns to the position before the displacement, pressing of the device main body 6 by the pressing member 50 to the inner side if the cassette main body 21 is stored in the device main body 6 can be suppressed. Therefore, the operation of storing the paper feed cassette 20 can be prevented from being hindered by providing the pressing member 50.

The urging member 60 urges the handle 30 toward the position before the displacement. According to this configuration, the operation of returning the handle 30 to the position before the displacement becomes unnecessary. Therefore, whenever the paper feed cassette 20 is retracted, the cassette main body 21 can be retracted by a small force by the assistance of the pressing member 50 without a particular operation.

The pressing member 50 includes the shaft 51 rotatably supported by the cassette main body 21 and the cam portion 53 supported by the shaft 51. The cam portion 53 is in contact with the device main body 6 on the inner side. According to this configuration, by rotating the shaft 51, the cam portion 53 presses the device main body 6 to the inner side. Accordingly, the pressing member 50 that presses the device main body 6 to the inner side can be formed.

The image processing device 1 includes the torque applying portion 40 that is in contact with the pressing member 50 and applies torque to the pressing member 50 about the second axis Q in response to the displacement of the handle 30. The pressing member 50 includes the arm 56 that is fixed to the shaft 51 and is in contact with the torque applying portion 40. The first distance D1 from the contact point of the torque applying portion 40 and the arm 56 to the second axis Q is larger than the second distance D2 from the contact point of the cam portion 53 and the device main body 6 to the second axis Q. According to this configuration, the force of pressing the device main body 6 by the pressing member 50 can be caused to be larger than the force of pressing the pressing member 50 by the torque applying portion 40. Therefore, the load of the user when retracting the paper feed cassette 20 can be effectively reduced.

The image processing device 1 includes the pull-in mechanism 10 that presses the cassette main body 21 to the inner side and pulls the cassette main body 21 into the device main body 6. The force of pressing the cassette main body 21 by the pull-in mechanism 10 becomes the maximum in a state where the cassette main body 21 is at the peak position. The pressing member 50 presses the device main body 6 in a state in which the cassette main body 21 is at least at the peak position. According to this configuration, in a state in which the load can be most applied to the user if the cassette main body 21 is retracted, the assistance of the pressing member 50 can be received. Therefore, the load of the user when retracting the paper feed cassette 20 can be effectively reduced.

If the user retracts the paper feed cassette 20, the pulling force to the front side by the user is applied to the handle 30. The force on the front side is applied to the pressing member 50 as a reaction force of the force of pressing the device main body 6 to the inner side by the pressing member 50. The force of the inner side from the pull-in mechanism 10 is applied to the cassette main body 21. The pull-in mechanism 10 is disposed between the handle 30 and the pressing member 50 in the width direction. According to this configuration, in the cassette main body 21, the point of action where the force of the front side is applied is generated so that the point of action of applying the force of the inner side is sandwiched. Accordingly, if the cassette main body 21 is displaced to the front side by the operation of the pressing member 50, the force can be suppressed from being applied to the cassette main body 21 so that the cassette main body 21 is tilted with respect to the depth direction. Accordingly, the paper feed cassette 20 can be smoothly retracted.

The pressing member 50 presses the device main body 6 to the same side with the pull-in mechanism 10 with respect to the intermediate position of the pair of right and left slide portions 11 in the width direction. If the pressing member presses the device main body 6 on a side opposite to the pull-in mechanism 10 with respect to the center of the pair of right and left slide portions 11 in the width direction, the cassette main body 21 can be tilted with respect to the depth direction. According to the present embodiment, if the cassette main body 21 is displaced to the front side by the operation of the pressing member 50, the force applied to the cassette main body 21 so that the cassette main body 21 is tilted with respect to the depth direction can be suppressed. Accordingly, the paper feed cassette 20 can be smoothly retracted.

The configuration of the extrusion mechanism is not limited to the above embodiment. For example, the cam portion 53 may not include the cam surface 54. The cam portion may be a lever that presses the device main body 6 according to the rotation of the shaft 51 by being supported by the shaft 51. In addition, the cam portion may include a roller at a contact portion with the device main body 6.

The extrusion mechanism may include a pressing member provided integrally with the handle. In this case, the pressing member may be a lever that rotates about an axis common to the handle and presses the device main body 6.

The extrusion mechanism may have a rack and pinion mechanism that transmits the displacement of the handle to the pressing member.

According to the above embodiment, the main configuration of the extrusion mechanism 26 is disposed on the right side of the paper feed cassette 20, but the embodiment is not limited to this configuration. For example, the main configuration of the extrusion mechanism may be disposed on the left portion.

According to the above embodiment, the handle 30 and the pressing member 50 are urged toward the position before the displacement by the urging member 60, but the embodiment is not limited to this configuration. For example, at least one of the handle and the pressing member may return to the position before the displacement by the gravity acting on the member forming the extrusion mechanism.

According to at least one embodiment described above, the pressing member that is supported by cassette main body and presses the device main body to the inner side in conjunction with the displacement of the handle with respect to the cassette main body is provided. Accordingly, the cassette main body can be retracted with a small force by the assistance of pressing member. Therefore, the load of the user when retracting the cassette main body can be reduced.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image processing device, comprising:
a cassette main body configured to contain a sheet;
a device main body configured to store the cassette main body retractably in a first direction;
a handle configured to be displaceably supported by the cassette main body;
a pressing member configured to be supported by the cassette main body and press the device main body in a second direction opposite to the first direction in conjunction with displacement of the handle with respect to the cassette main body; and
a locking member configured to be supported by the cassette main body, locked by the device main body, and release the locking by the device main body in conjunction with displacement of the handle,
wherein the pressing member is displaced integrally with the locking member.

2. The image processing device according to claim 1, wherein the handle is displaceable in the first direction with respect to the cassette main body, and
the pressing member presses the device main body in conjunction with displacement of the handle in the first direction.

3. The image processing device according to claim 1, wherein the pressing member presses the device main body after the locking of the locking member by the device main body is released.

4. The image processing device according to claim 1, wherein the pressing member is provided separately from the handle.

5. The image processing device according to claim 1, further comprising:
an urging member configured to urge the pressing member toward a position before displacement.

6. The image processing device according to claim 5, wherein the urging member urges the handle toward the position before displacement.

7. The image processing device according to claim 1, wherein the pressing member comprises
a shaft configured to be rotatably supported by the cassette main body; and
a cam portion configured to be supported by the shaft and in contact with the device main body in the second direction.

8. An image processing device, comprising:
a cassette main body configured to contain a sheet;
a device main body configured to store the cassette main body retractably in a first direction;
a handle configured to be displaceably supported by the cassette main body; and
a pressing member configured to be supported by the cassette main body and press the device main body in a second direction opposite to the first direction in conjunction with displacement of the handle with respect to the cassette main body
wherein the pressing member comprises
a shaft configured to be rotatably supported by the cassette main body; and
a cam portion configured to be supported by the shaft and in contact with the device main body in the second direction.

9. The image processing device according to claim 8, further comprising:
a torque applying portion configured to contact with the pressing member and apply torque of a rotation axis of the shaft to the pressing member in response to displacement of the handle,
wherein the pressing member further comprises an arm configured to be fixed to the shaft and in contact with the torque applying portion, and
a distance from a contact point of the torque applying portion and the arm to the rotation axis is larger than a distance from a contact point of the cam portion and the device main body to the rotation axis.

10. The image processing device according to claim 8, further comprising:
a locking member configured to be supported by the cassette main body, locked by the device main body, and release the locking by the device main body in conjunction with displacement of the handle,
wherein the pressing member is displaced integrally with the locking member.

11. A cassette system, comprising:
a cassette main body comprising a sheet holding section and configured to be stored retractably at least partially in an image forming apparatus in a first direction;
a handle configured to be displaceably supported by the cassette main body; and
a pressing member configured to be supported by the cassette main body and press the image forming apparatus in a second direction opposite to the first direction in conjunction with displacement of the handle with respect to the cassette main body,
wherein the pressing member comprises
a shaft configured to be rotatably supported by the cassette main body; and
a cam portion configured to be supported by the shaft and in contact with the image forming apparatus in the second direction.

12. The cassette system according to claim 11,
wherein the handle is displaceable in the first direction with respect to the cassette main body, and
the pressing member presses the image forming apparatus in conjunction with displacement of the handle in the first direction.

13. The cassette system according to claim 11, further comprising:
a locking member configured to be supported by the cassette main body, locked by the image forming apparatus, and release the locking by the image forming apparatus in conjunction with displacement of the handle,
wherein the pressing member is displaced integrally with the locking member.

14. The cassette system according to claim 13,
wherein the pressing member presses the image forming apparatus after the locking of the locking member by the image forming apparatus is released.

15. The cassette system according to claim 13,
wherein the pressing member is provided separately from the handle.

16. The cassette system according to claim 11, further comprising:
an urging member configured to urge the pressing member toward a position before displacement.

17. The cassette system according to claim 16,
wherein the urging member urges the handle toward the position before displacement.

* * * * *